Sept. 24, 1968

F. J. PANSINI 3,403,313

CONSTANT POWER, VARYING SPEED POLYPHASE MOTOR

Filed Oct. 21, 1965

INVENTOR.
FRANCIS J. PANSINI
BY
ATTORNEYS

Sept. 24, 1968   F. J. PANSINI   3,403,313
CONSTANT POWER, VARYING SPEED POLYPHASE MOTOR
Filed Oct. 21, 1965   2 Sheets-Sheet 2
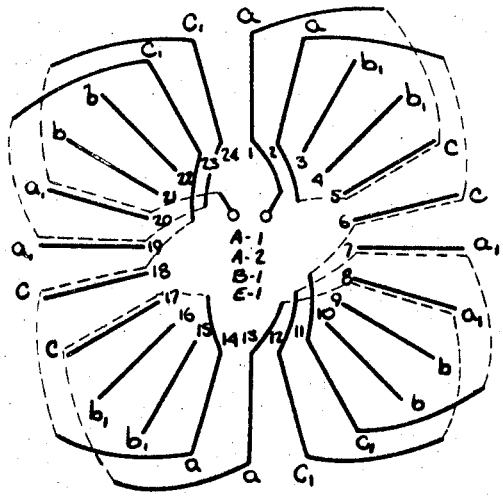
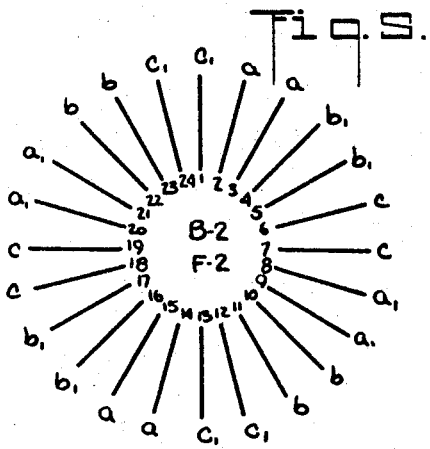
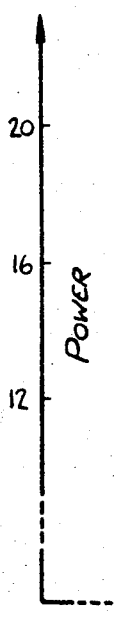
INVENTOR.
FRANCIS J. PANSINI
BY
ATTORNEYS

United States Patent Office 3,403,313
Patented Sept. 24, 1968

3,403,313
CONSTANT POWER, VARYING SPEED
POLYPHASE MOTOR
Francis J. Pansini, 43 Maxwell Road,
Garden City, N.Y. 11530
Filed Oct. 21, 1965, Ser. No. 499,843
31 Claims. (Cl. 318—225)

ABSTRACT OF THE DISCLOSURE

A self-regulating varying speed, constant power alternating current motor which has two induction motor type stator windings and two wound rotor type rotor windings; currents transferred from the stator windings to the rotor windings, and vice versa, solely by inductive means; and the rotor assembly as its only moving part. A similar adjustable speed alternating current motor having a variable reactance for varying the current supplied to selected stator windings.

Disclosure of the invention

My invention relates in general to varying speed, alternating current (A.C.) motors which provide a substantially constant power output over a range of speeds, and to varying speed, and adjustable varying speed, A.C. motors which use inductive coupling between stationary and rotating portions of the motor. Such motors are useful where it is desirable to have maximum power output available over a range of speeds, for example, in traction applications in the automotive and locomotive fields.

Alternating current motors of the induction-type which provide a substantially constant power output by means of auxiliary regulating means are known in the motor art. Motors of this type include, for example, the "Constant Horsepower Scherbius System" and the "Constant Horsepower Krämer Drive" discussed in Pender and Del Mar, Electrical Engineers' Handbook, pp. 9–107 to 9–108 and p. 9–110 (John Wiley & Sons, Inc., 4th ed., 1949); and in Puchstein, Lloyd & Conrad, Alternating Current Machines, pp. 344–45, 348–49 (John Wiley & Sons, Inc., 3d ed., 1956).

In the "Constant Horsepower Scherbius System" a regulating device is connected to an A.C. induction motor for converting the slip energy of the motor into mechanical energy which is returned to the motor shaft. The field winding on the stator of the regulator device is connected through a stationary autotransformer having adjustable taps to slip rings on the rotatable secondary winding of the motor, and the armature of the regulator device is connected to the slip rings by means of brushes. A compensating winding may also be placed on the stator of the regulating device and connected in series with the rotor (armature) of the regulating device. The speed of the induction motor is varied by changing the position of the taps on a stationary autotransformer, and thereby controlling the voltage applied to the field (stator) of the regulating device.

In the "Constant Horsepower Krämer System," a rotary A.C. to D.C. converter is used to convert the slip energy of an induction motor into electric energy, and a D.C. motor is used to convert this electric energy into mechanical energy which is returned to the shaft of the induction motor. Slip rings are generally used in transferring the slip energy from the induction motor to the rotary converter.

A third prior art method for providing a constant power output by means of an induction motor and an auxiliary regulating means is shown generally in U.S. Patent No. 1,964,548, which issued on June 26, 1934. In the arrangement shown in this patent, voltage is transferred by means of brushes from the rotatable secondary winding of an induction motor to compensating and commutating windings on the stator of a regulating device and, once again by brushes, from these latter windings to the rotatable armature of the regulating device. The rotatable armature of the regulating device is on the same shaft as the rotatable secondary winding of the motor. The speed of the motor is varied by changing the position of taps on a stationary autotransformer connected between the exciting winding of the stator of the regulating device and brushes on the rotor of the induction motor, thereby controlling the voltage applied to the stator of the regulating device.

All three of the systems just described require auxiliary regulating means; all three require brushes, commutators, slip rings or some other type of sliding or moving contacts; all three use ordinary A.C. induction motors as the main motor; all three use conductive rather than inductive means to transfer voltages and currents from the main motor to the regulating means; and none of the three are self-regulating.

It is one object of my invention to provide a varying speed A.C. motor which provides a substantially constant power output over a range of speeds.

It is a further object of my invention to provide an A.C. motor which is self-regulating, i.e., one in which output torque varies in proportion to variations in output speed without a need to adjust transformer taps, the supply voltage, or any other element or parameter.

It is a further object of my invention to provide an A.C. motor which is simple and self-contained and requires no auxiliary regulator units.

It is a further object of my invention to provide an A.C. motor which can be operated at low output speeds and which, at such speeds, provides a high output torque.

It is a further object of my invention to provide an A.C. motor which operates on principles of a synchronous motor as well as on principles of an induction motor.

It is a further object of my invention to provide an A.C. motor which uses only inductive means to transfer voltages to and from rotatable and stationary portions of the motor.

It is a further object of my invention to provide an A.C. motor having only one moving part, the rotor structure.

It is a further object of my invention to provide an A.C. motor in which the need for brushes, commutators, slip rings or other similar sliding or moving contacts is eliminated.

It is a further object of my invention to provide an adjustable varying speed A.C. motor in which the motor's speed can be adjusted to any value within a range of speeds, and in which, for each adjustment, the speed varies with changes in load.

Other objects and a fuller understanding of my invention may be had by referring to the following descriptions and claims and the accompanying drawings, in which:

FIG. 1 is an electrical schematic diagram of a preferred embodiment of my invention in which the windings on stator elements are shown to the left of vertical dashed-line 20—20, and the windings on rotor elements are shown to the right of line 20—20, and in which horizontal dashed-lines 30—30, 40—40, 50—50, 60—60, 70—70, 80—80 and 90—90 divide the schematic diagram into sections A, B, C, D, E and F corresponding to the sections of the motor in which the windings are physically located;

FIG. 2 is a diagrammatic representation of the rotor and stator elements of sections A, B, C, E and F of the preferred embodiment of my invention;

FIGS. 3–5, inclusive, are diagrammatic representations of the slot distribution of the windings of sections A, B, E and F of the preferred embodiment of my invention;

FIG. 8 is a graphical representation of the output and input powers of a particular embodiment of my invention as a function of the speed of the motor.

Figure 1:
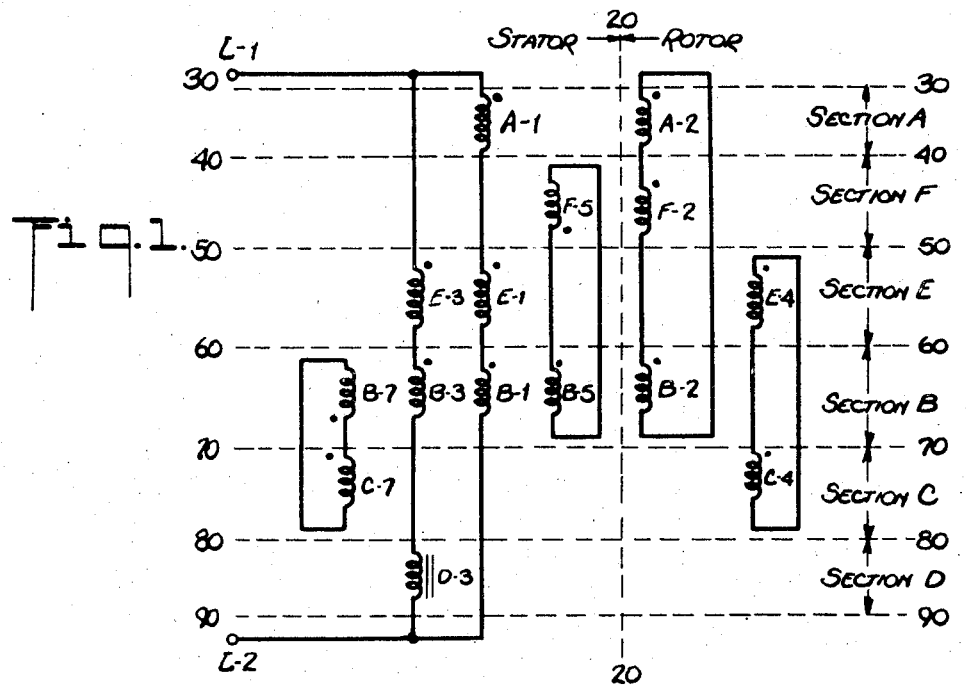

Polyphase motors are generally classified as either induction motors or synchronous motors. Both types are essentially single speed motors. I have found that the principles of these two types of polyphase motors may be embodied in a single motor in a way that a varying speed, constant power motor can be obtained.

The motor of this invention has the equivalent of an induction motor field winding and the equivalent of a synchronous motor D.C. field winding in a common frame, and the equivalent of an induction motor wound rotor and the equivalent of a synchronous motor armature winding on a common shaft. Thus, the motor has what might be referred to as an induction motor section (section A of the preferred embodiment of FIGS. 1 and 2) and a synchronous motor section (section B of the preferred embodiment of FIGS. 1 and 2). In the synchronous motor section, both the field and the armature currents are polyphase alternating currents in contradistinction to the usual industrial synchronous motor where the field current is generally D.C. The field has a distributed winding producing rotating flux.

When a rotatable closed circuit armature winding is positioned such that it cuts the flux lines of a rotating magnetic field, as it does in the ordinary A.C. induction motor, power is transmitted across the air gap due to the combined "transformer" and "rotation" voltages induced in the rotating armature. The "transformer" voltage is the voltage produced when the rotor (armature) remains stationary and the magnetic field rotates; and the "rotation" voltage is the voltage produced when the rotor (armature) rotates and the magnetic field remains stationary.

I have found that the transformer voltage may be neutralized such that only the rotation voltage remains, and that the requirements for synchronous motor action are then present, as there is an A.C. field which does not couple with the armature winding but is always in synchronous relationship with it. This A.C. field thus acts exactly like the D.C. field of the ordinary synchronous motor.

In the preferred embodiment of my invention, neutralization of the transformer voltage of "synchronous motor field winding" B–1 is accomplished in general terms as follows. Slip frequency current is provided to an auxiliary winding B–7 on the same stator structure bearing winding B–1 such that the slip frequency flux produced by winding B–7 rotates oppositely to the line frequency flux of winding B–1. As "synchronous motor armature winding" B–2 rotates, the frequency of the voltage induced in this winding is the sum of the slip frequency plus the rotation frequency, which sum is always the line frequency. This line frequency voltage is oppositely directed to the transformer voltage produced by winding B–1 and is used to neutralize the transformer voltage. With the transformer voltage of winding B–1 neutralized, only rotation voltage is induced in winding B–2 by winding B–1.

Self-regulation is obtained in the preferred arrangement of this invention, speaking in general terms, by providing a current in "synchronous motor field winding" B–1 which is the quadrature component of the current in "induction motor primary winding" A–1, whose secondary A–2 is connected in series with "synchronous motor armature winding" B–2. The power component of the current in winding B–1 is neutralized by means of an oppositely directed current in an auxiliary winding B–3 on the same stator structure as winding B–1. The combination of winding B–1 in series with winding A–1, and of winding B–2 in series with the winding A–2, yields a quadrature component of the proper characteristics required to produce a substantially constant power component.

Referring now to FIG. 1, which is an electrical schematic diagram of the preferred embodiment of my invention, the windings on stator elements of the motor are shown to the left of vertical dashed-line 20—20 and the windings on rotor elements are shown to the right of line 20—20. For convenience and clarity, FIG. 1 is also divided into sections by horizontal dashed-lines 30—30, 40—40, 50—50, 60—60, 70—70, 80—80 and 90—90 according to the physical location of the windings in the motor. The function of the horizontal reference lines in FIG. 1 may be made clear by reference to FIG. 2, which is a schematic representation of the rotor and stator elements of sections A, B, C, E, and F. Thus, in the preferred embodiment of my invention:

Winding A–1 is located on stator element SA of section A;

Winding A–2 is located on rotor element RA of section A;

Windings B–1, B–3, B–5 and B–7 are located on stator element SB of section B;

Winding B–2 is located on rotor element RB of section B;

Winding C–7 is located on the stator portion SC of section C;

Winding C–4 is located on the rotor portion RC of section C;

Winding D–3 is located externally on the motor frame;

Windings E–1 and E–3 are located on the stator element SE of section E;

Winding E–4 is located on the rotor element RE of section E;

Winding F–5 is located on the stator element SF of section F; and

Winding F–2 is located on the rotor element RF of section F.

The first letter of the designations for the various windings shown in FIG. 1 corresponds to the section of the motor in which the winding is located.

Considering the various windings shown in FIG. 1 in more detail, in the preferred embodiment of my invention, the motor is energized by applying an A.C. line voltage between terminals L–1 and L–2. The line voltage is thereby applied across the series combination of windings A–1, E–1 and B–1, and also across the series combination of windings E–3, B–3 and D–3. The remaining stator windings include windings B–7 and C–7 which are connected in series in a closed circuit, and windings F–5 and B–5, which are also connected in series in a closed circuit.

The rotor windings comprise windings A–2, F–2 and B–2, which are connected in series in a closed circuit, and windings E–4 and C–4, which are also connected in series in a closed circuit.

The polarity of the various windings shown in FIG. 1 is indicated by dots alongside the windings.

Windings A–1 and A–2 are primary and secondary windings of the usual wound induction motor type, the former carries a current of line frequency and the latter a current of slip frequency.

Winding D–3 is a reactance winding preferably wound on a laminated iron core or a laminated core of high grade silicon steel. It has an inductance sufficient to cause the line frequency current passing through it and windings B–3 and E–3 to be in lagging quadrature with respect to the terminal voltage.

Winding B–3 is a compensating winding which is wound with the proper number of turns but in lagging quadrature with respect to winding B–1. Being so wound, and having a current passing through it which is also in lagging quadrature, the ampere-turns of winding B–3 are the same as those of winding B–1 but oppositely directed, thereby neutralizing the power component of the current in winding B–1 leaving only the quadrature component of current to produce flux in the air gap.

Winding B–1 carries current of line frequency and, in conjunction with compensating windings B–3 and B–7, produces only a rotation voltage in winding B–2. The function of compensating winding B–7 will be further described below.

Winding B–2 carries current of slip frequency and is wound 30 degrees lagging with respect to winding A–2 to increase the torque at low motor speeds and thereby also maintain the power rating of the motor at such speeds. Winding B–2 cuts the rotating flux due to windings B–1, B–3 and B–7. There is induced in winding B–2 a rotation voltage which is approximately equal in magnitude to the voltage transferred to induction-motor type rotor winding A–2 from stator winding A–1.

Windings E–1 and E–3 carry currents of line frequency and together produce only flux corresponding to the quadrature current in winding E–1 and also provide slip frequency current in winding E–4.

Winding E–4 is the rotating secondary of a transformer whose primary is windings E–1 and E–3, and it carries a voltage which is a function of the quadrature current of winding E–1 but of slip instead of line frequency.

Winding C–4 is in series with winding E–4 and receives a current of slip frequency from the latter. The slip frequency voltage of winding C–4 is transferred inductively to winding C–7, which is the secondary of a transformer in which winding C–4 is a rotating primary. The voltage transferred is of slip frequency as windings C–4 and C–7 are placed in slots circular about the axis of the motor shaft and are of the usual transformer type rather than of the wound rotor type as are the windings in sections A, B, E and F of the motor.

Winding B–7 is an auxiliary winding in series with winding C–7, and receives a current of slip frequency from the latter. The slip frequency flux generated by winding B–7 neutralizes the transformer voltage of windings B–1 and B–3 in B–2. Winding B–7 is wound in lagging quadrature with respect to winding B–1 as shown in FIGS. 3 and 4. By means of windings C–4 and C–7, it receives its current from winding E–4 which is also wound in lagging quadrature with respect to winding B–1. As a result, the current in winding B–7 is in proper time and space phase to produce a flux which induces a line frequency voltage of proper polarity in winding B–2.

Winding B–5 is used to neutralize the effect of winding B–2 on winding B–1. It has the same number of turns as winding B–2 and carries a current equal and opposite to the current in winding B–2. Windings F–2 and F–5 act as a current transformer with winding F–2 as a rotating primary. Windings F–5 and B–5 are both wound in lagging quadrature with respect to windings A–1 and B–1.

Undesired interaction between the windings of the motor has been kept to a minimum in various ways, as follows.

Winding B–7, carrying a current of slip frequency, cannot react with the other windings in section B of the motor because the latter all carry currents of line frequency.

Considering windings B–1 and B–3 in combination, these windings cannot react with winding B–7 or winding B–5 as the latter are positioned in space quadrature with respect to winding B–1.

Windings B–1 and B–3 and B–7 in combination produce only rotation voltage in winding B–2.

Windings B–2 and B–5 neutralize each other and consequently cannot affect the other windings.

The current in winding B–7 produces slip frequency flux which is coupled to windings B–3 and B–5. A relatively small slip frequency current is produced in winding B–3 which is small enough in magnitude such as not to adversely affect the operation of the motor. It is in the order of 1.3 amps in the preferred embodiment described below and can be disregarded. A slip frequency voltage is also induced in winding B–5 due to the slip frequency flux of winding B–7. Part of the voltage induced in winding B–5 is transmitted through current transformer windings F–2 and F–5 and appears as line frequency current in winding B–2. But, as windings B–2 and B–5 do not couple because of the difference in the frequency of the currents in these windings, the effective reactance of windings B–2 and B–5 is high, and the current supplied by winding B–7 to windings B–5 and B–2 does not adversely affect the operation of the motor and can be disregarded.

By way of example, the following is a winding schedule for a three-phase, 440 volt, nominal 10 horsepower motor, with a speed range in the order of 540 revolutions per minute to 1680 revolutions per minute embodying my invention.

| Winding | AWG copper wire gauge | Number of turns |
|---------|----------------------|-----------------|
| A–1     | two #12              | 54              |
| A–2     | two #12              | 54              |
| B–1     | #14                  | 14              |
| B–2     | #12                  | 144             |
| B–3     | #14                  | 42              |
| B–5     | #13                  | 144             |
| B–7     | #14                  | 13              |
| C–4     | #16                  | 160             |
| C–7     | #16                  | 160             |
| D–3     | #12                  | 98              |
| E–1     | #20                  | 45              |
| E–3     | #20                  | 135             |
| E–4     | #14                  | 45              |
| F–2     | #12                  | 29              |
| F–5     | #12                  | 29              |

In the preferred embodiment of my invention just described, winding D–3 has an inductance of approximately 0.1 henry.

Figure 2:
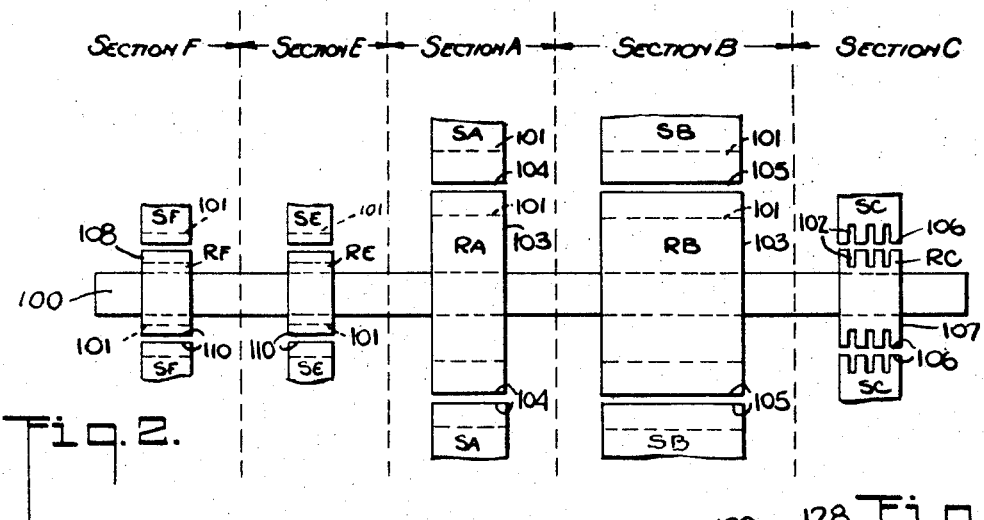

FIG. 2 is a diagrammatic representation of the rotor and stator elements of sections A, B, C, E and F of the preferred embodiment of my invention. It shows cylindrical rotor elements RA, RB, RC, RE and RF mounted on a common shaft 100 which is also the output shaft of the motor. These rotor elements rotate within corresponding stator elements SA, SB, SC, SE and SF. The location of the various windings of the stator and rotor elements is shown schematically by dashed-lines 101. Slots 102 for the windings for stator element SC and rotor element RC are also shown schematically.

In the specific embodiment of my motor for which a winding schedule was given above, the diamer 103 of rotor elements RA and RB is 12 inches, the stack length 104 of rotor element RA and stator element SA is 4.2 inches, the stack length 105 of rotor element RB and stator element SB is 8.4 inches. The stack length 106 of rotor element RC and stator element SC is 3.4 inches and the diameter of rotor element RC is 6.0 inches. A spacing of 5.2 inches is allowed on each side of rotor elements RA and RB, and on each side of stator elements SA and SB, for the end-turns of the windings on these members. Since the spacing between stator elements SA and SB and also between rotor elements RA and RB must be adequate for the end-turns of both the windings in section A and the windings in section B of the motor, the spacing between these elements is doubled and is 10.4 inches.

The diameter 108 of rotor elements RE and RF is 5.0 inches and the stack length 110 of rotor elements RE and RF and stator elements SE and SF is in each case 3.0 inches. A spacing of 2.6 inches is allowed on each side of rotor elements RE and RF and stator elements SE and SF for the end-turns of the windings on these members. Since the spacing between stator elements SE and SA and also between rotor elements RE and RA must be adequate for the end-turns of the windings in section E as well as the windings in section A of the motor, the spacing between these elements is 7.8 inches.

Rotor elements RA, RB, RC, RE and RF are preferably laminates of sheet steel, as are stator elements SA, SB, SC, SE and SF.

FIG. 3 is a diagrammatical representation of the slot distribution of windings A–1, A–2, B–1 and E–1 in the preferred embodiment of my invention. As is shown in FIG. 3, these windings are three-phase, 4 pole windings with a ⅔ winding pitch. The three phases of the windings are represented by designations $a$, $b$ and $c$, respectively. The subscripts to designations $a$, $b$ and $c$ designate windings of opposite polarity. The numerals 1–24, inclusive, designate the slots in which the windings are placed and also provide a reference for the leading or a lagging position of the various windings with respect to one another, and with respect to the windings shown in FIGS. 4 and 5, in which figures a similar system of designations of the phases and of the slots is also used. Windings A–1, A–2, B–1 and E–1 are each lap wound. The method of lap winding is shown for phase $a$. For purposes of clarity the way in which phases $b$, and $c$ is lap wound is not specifically illustrated, but these phases are wound in a manner corresponding to that shown for phase $a$.

FIG. 4 is a diagrammatical representation of the slot distribution of windings B–3, B–5, B–7, E–3, E–4 and F–5 in the preferred embodiment of my invention. As is shown in FIG. 4, these windings are three-phase, 4 pole windings with a ⅔ winding pitch. The windings are lap wound and are displaced 90 electrical degrees in a lagging position with respect to the windings of FIG. 3. The designations of the various phases and windings correspond to the designations of FIG. 3. The way in which each of the windings is lap wound is not shown in FIG. 4 as the lap winding of FIG. 4 corresponds to that of FIG. 3.

FIG. 5 is a diagrammatical representation of the slot distribution of windings B–2 and F–2 in the preferred embodiment of my invention. As is shown in FIG. 5, windings B–2 and F–2 are three-phase, 4 pole windings with a ⅔ winding pitch. The windings are lap wound and are displaced 30 electrical degrees in a lagging position with respect to the windings of FIG. 3. The method by which each of these windings is lap wound is not shown in FIG. 5 as it corresponds to the method shown in FIG. 3.

Figure 6:
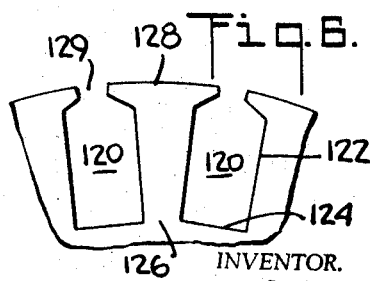
FIG. 6 is a diagrammatic cross-sectional representation of the winding slots of the rotor elements of sections A and B of the preferred embodiment of my invention.

FIG. 6 is a diagrammatic cross-sectional representation of the winding slots 120 of the rotor elements RA and RB of sections A and B of the preferred embodiment of my invention. In the embodiment of my invention for which a winding schedule was given above, slots 120 have a slot depth 122 of 1.6 inches and a slot width 124 of 0.79 inch. Width 126 of the bottom of the teeth is 0.36 inch, the width 128 of the tooth tip is 1.29 inches, and the spacing 129 between the tips of adjacent teeth is 0.28 inch. The arc formed by the teeth tips has a radius of six inches, which is ½ the diameter of rotor elements RA and RB. The slots for the windings in stator elements SA and SB are similar in configuration to the slots 120 for the windings on the rotor elements RA and RB, but the periphery of the teeth is concave rather than convex, and the radius of the periphery is six inches plus the length of the air gap between the stator element and its corresponding rotor element. In the preferred embodiment of my invention, the air gap length is 0.063 inch.

Figure 7:
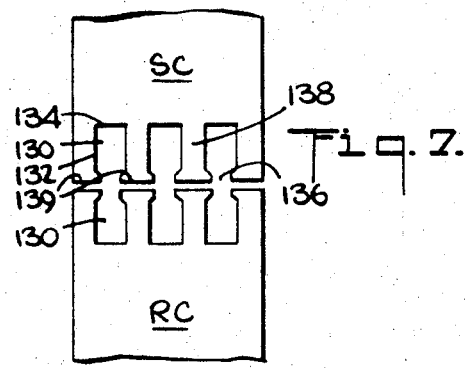
FIG. 7 is a diagrammatic cross-sectional representation of the winding slots of the rotor and stator element of section C of the preferred embodiment of my invention.

FIG. 7 is a diagrammatic cross-sectional representation of the winding slots 130 of the rotor RC and stator SC of section C of the motor. It will be noted that slots 130 shown in FIG. 7 corresponds to slots 104 shown in FIG. 2 except that the slots 104 of FIG. 2 are more diagrammatic and do not show the configuration of the tips of the teeth. In the embodiment of my invention for which a winding schedule was given above, slots 130 have a slot depth 132 of 0.9 inch, a width 134 at their base of 0.6 inch, and a width 136 at their top of 0.2 inch. The teeth have a width 138 at their base of 0.4 inch and a width 139 at their tip of 0.8 inch.

In a three-phase embodiment, the phases of each of the windings in sections A, B, C, D, E, and F of the motor are preferably connected in a delta arrangement. All of the windings in sections A, B, E and F of the motor are preferably of the ordinary wound induction motor type. The windings in section C of the motor are each ordinary transformer-type windings rather than induction motor type windings.

The embodiment of this invention first described with reference to FIGS. 1–7 is a varying speed motor, i.e., a motor which has a speed which varies with its torque. An adjustable varying speed motor, i.e., a motor in which the speed can be adjusted to any value within the motor's speed range, but in which, for each adjustment, the speed varies with changes in load, may be obtained by eliminating windings E–1 and B–1 and making other changes as follows.

Windings E–3 and B–3 are positioned in space phase with winding A–1, and reactance winding D–3 is replaced by an auto-transformer which permits variation of the percentage of the line voltage applied to windings E–3 and B–3. By varying the current in winding B–3 the voltage induced in winding B–2 is also varied. The torque output of the motor is the torque due to the current in winding A–2 reacting with the flux due to winding A–1 plus the torque due to the same current in winding B–2 reacting with the flux due to winding B–3. When the current in winding B–3 is low in magnitude, the operation of the motor is much like a squirrel cage motor in that most of the torque is developed in winding A–2. As the current in winding B–3 is increased, the voltage induced in winding B–2 is increased and the current in winding A–2 tends to decrease and the motor slows down. The voltage in winding A–2 then increases and the current in winding A–2 increases until the developed torque is in equilibrium with the torque required by the load at equilibrium speed.

Except for the elimination of windings E–1 and B–1, the substitution of an auto-transformer for reactance winding D–3, and the placing of windings B–3 and E–3 in space phase with one another and with winding A–1, this adjustable, varying speed embodiment of my motor corresponds to the preferred embodiment of my motor described above.

My studies indicate that a three-phase, 440 volt, nominal 10 horsepower varying speed motor embodying my invention and having the winding schedule and distribution, and dimensions and other characteristics set forth above will provide a substantially constant power output over a speed range of 540 revolutions per minute to 1680 revolutions per minute, and deliver a high starting torque which is about 2.5 times the torque delivered at 540 revolutions per minute. I have also found that over its speed range, the product of the torque delivered to the shaft and the speed of the shaft will remain substantially constant. Also, the motor is self-regulating, i.e., the output torque varies in inverse proportion to variations in output speed without a need to adjust transformer taps, the supply voltage, or any other element or parameter. These characteristics are shown graphically in FIG. 8 in which curve 150 is a representation of the input power of this embodiment of my invention, in horsepower, as a function of the speed of the motor, in revolutions per minute, and curve 160 is a representation of the output power of this embodiment, in horsepower, as a function of the speed of the motor, in revolutions per minute.

Design equations which I have found useful in the design of motors embodying my invention include the following.

The rotation voltage for a magnetic circuit which includes an air gap and in which the iron pattern of the path may be disregarded may generally be expressed as:

$$e_R = \frac{p^2 N_2 (N_1 i_1 - N_2 i_2) A n}{10^7 l}$$

where:

$e_R$=number of poles
$p$=number of poles
$N_1$=number of turns per pole in stator
$N_2$=number of turns per pole in armature
$A$=area per pole in square inches
$i_1$=stator current in amps
$i_2$=armature current in amps
$n$=motor speed in revolutions per second
$l$=length of air gap in inches The transformer voltage for a magnetic circuit which includes an air gap and in which the iron portion of the path may be disregarded may generally be expressed as:

$$e_{TA} = \frac{1.1 N^2 i_0 A}{10^5 l}$$

where:

$e_{TA}$=transformer voltage in volts
$N$=number of turns per winding
$i_0$=magnetization current in amps
$A$=area of air gap in square inches
$l$=length of air gap in inches The transformer voltage for a magnetic circuit consisting solely of iron may generally be expressed as:

$$e_{TI} = \frac{0.03 N^2 i_0 A}{l}$$

where:

$e_{TI}$=transformer voltage in volts
$N$=number of turns per winding
$i_0$=magnetization current in amps
$A$=area of iron core in square inches
$l$=length of iron path in inches It is seen that by practicing my invention in the manners described, it is possible to accomplish the objects of my invention discussed above, including the provision of a varying speed, self-regulating A.C. motor which provides a substantially constant power output over a range of speeds and is simple and self-contained and requires no auxiliary regulator units, and which uses inductive rather than conductive means to transfer voltages to and from rotatable and stationary portions of the motor.

It is also seen that by practicing my invention in the manners described, an adjustable varying speed motor may be provided.

Although my invention has been described with a certain degree of particularity, it is understood that the present disclosure has been made only by way of example, and that changes may be made in the details of construction and method of operation and in the combination and arrangement of parts without departing from the spirit and scope of the invention.

I claim:
1. An alternating current motor comprising:
    (a) A motor frame;
    (b) A motor shaft rotatably mounted within said frame;
    (c) A pair of energizing terminals;
    (d) A first stator winding mounted to said frame;
    (e) A second stator winding mounted to said frame;
    (f) A third stator winding mounted to said frame; said first, second and third stator windings being connected in electrical series and the series combination being connected across said terminals;
    (g) A fourth stator winding mounted to said frame;
    (h) A fifth stator winding mounted to said frame;
    (i) A sixth stator winding mounted to said frame, said fourth, fifth and sixth stator windings being connected in electrical series and the series combination being connected across said terminals;
    (j) A seventh stator winding mounted to said frame;
    (k) An eighth stator winding mounted to said frame, said seventh and eighth stator windings being connected in electrical series in a closed circuit;
    (l) A ninth stator winding mounted to said frame;
    (m) A tenth stator winding mounted to said frame, said ninth and tenth stator windings being connected in electrical series in a closed circuit;
    (n) A first rotor winding mounted to said shaft;
    (o) A second rotor winding mounted to said shaft;
    (p) A third rotor winding mounted to said shaft, said first, second and third rotor windings being connected in electrical series in a closed circuit;
    (q) A fourth rotor winding mounted to said shaft; and
    (r) A fifth rotor winding mounted to said shaft, said fourth and fifth rotor windings being connected in electrical series in a closed circuit.

2. The alternating current motor recited in claim 1 wherein said first, second, third, fourth, fifth, seventh, ninth and tenth stator windings, and said first, second, third and fourth rotor windings are of the wound induction motor type.

3. The alternating current motor recited in claim 1 wherein the power component of the current in said second stator winding is neutralized by a current of opposing polarity in said fifth stator winding.

4. The alternating current motor recited in claim 1 wherein the electromagnetic flux produced by said seventh stator winding rotates in an opposite direction to the electromagnetic flux produced by said second stator winding.

5. The alternating current motor recited in claim 1 wherein said sixth stator winding has a reactance sufficient to cause the current passing through it to be in lagging quadrature with respect to the supply voltage applied across said energizing terminals.

6. The alternating current motor recited in claim 1 wherein said second, fifth, seventh and tenth stator windings are electromagnetically coupled; and said third and fourth stator windings are electromagnetically coupled.

7. The alternating current motor recited in claim 1 wherein:
    (a) Said first stator winding is electromagnetically coupled to said first rotor winding;
    (b) Said ninth stator winding is electromagnetically coupled to said third rotor winding;
    (c) Said third and fourth stator windings are electromagnetically coupled to said fourth rotor winding; and
    (d) Said eighth stator winding is electromagnetically coupled to said fifth rotor winding.

8. The alternating current motor recited in claim 1 wherein:
    (a) Said first rotor winding and said first, second and third stator windings are wound in phase with each other;
    (b) Said second and third rotor windings are wound with a displacement of thirty electrical degrees in a lagging direction with respect to said first rotor winding and said first, second and third stator windings; and
    (c) Said fourth rotor winding and said fourth, fifth, seventh, ninth and tenth stator windings are wound with a displacement of ninety electrical degrees in a lagging direction with respect to said first rotor winding and said first, second and third stator windings.

9. The alternating current motor recited in claim 1 wherein
    (a) Said first stator winding is mounted to said motor frame in a first section of said frame;
    (b) Said second, fifth, seventh and tenth stator windings are mounted to said motor frame in a second section of said frame;
(c) Said eighth stator winding is mounted to said motor frame in a third section of said frame;
(d) Said sixth stator winding is mounted to said motor frame in a fourth section of said motor frame;
(e) Said third and fourth stator windings are mounted to said motor frame in a fifth section of said frame; and
(f) Said ninth stator winding is mounted to said motor frame in a sixth section of said frame.

10. The alternating current motor recited in claim 1 wherein said first, second, third, fourth and fifth rotor windings are each mounted to said motor shaft on separate rotor structures attached to said shaft.

11. The alternating current motor recited in claim 1 wherein:
(a) Said first stator winding is mounted to said motor frame in a first section of said frame;
(b) Said second, fifth, seventh and tenth stator windings are mounted to said motor frame in a second section of said frame;
(c) Said eighth stator winding is mounted to said motor frame in a third section of said frame;
(d) Said sixth stator winding is mounted to said motor frame in a fourth section of said motor frame;
(e) Said third and fourth stator windings are mounted to said motor frame in a fifth section of said frame;
(f) Said ninth stator winding is mounted to said motor frame in a sixth section of said frame;
(g) Said first, second, third, fourth and fifth rotor windings are each mounted to said motor shaft on separate rotor structures attached to said shaft.

12. The alternating current motor recited in claim 11 wherein said first, second, third, fourth, fifth, seventh, ninth and tenth stator windings, and said first, second, third and fourth rotor windings are of the wound induction motor type.

13. The alternating current motor recited in claim 1 wherein said eighth stator winding and said fifth rotor winding comprise a transformer having said fifth rotor winding as a rotating primary and said eighth stator winding as a stationary secondary thereof.

14. The alternating current motor recited in claim 1 wherein said first, second, third, fourth, fifth, eighth and tenth stator windings and said first, second, third, fourth and fifth rotor windings have the same polarity, and wherein said seventh and ninth stator windings have a polarity opposite thereto.

15. The alternating current motor recited in claim 1 wherein voltages are transferred to rotor windings of the motor from stator windings of the motor, and to stator windings of the motor from rotor windings of the motor, solely by inductive means.

16. The alternating current motor recited in claim 1 wherein said second stator winding and said second rotor winding are energized solely by A.C. voltages and currents.

17. An alternating current motor comprising:
(a) A motor frame;
(b) A motor shaft rotatably mounted within said frame;
(c) A first stator winding mounted to said frame;
(d) A first rotor winding mounted to said shaft;
(e) A second stator winding mounted to said frame;
(f) A second rotor winding mounted to said shaft; and
(g) Means for neutralizing the transformer voltage in said second rotor winding such that only rotation voltage is induced in said second rotor winding.

18. The alternating current motor recited in claim 17 wherein said first and second stator windings and said first and second rotor windings are of the wound induction motor type.

19. An alternating current motor comprising:
(a) A motor frame;
(b) A motor shaft rotatably mounted within said frame;
(c) A first stator winding mounted to said frame;
(d) A first rotor winding mounted to said shaft;
(e) A second stator winding mounted to said frame;
(f) A second rotor winding mounted to said shaft; and
(g) A transformer having a rotatable primary winding mounted to said shaft and a secondary winding mounted to said frame for transferring slip frequency energy from rotatable windings of the motor to stationary windings of the motor.

20. The alternating current motor recited in claim 19 wherein said first and second stator windings and said first and second rotor windings are of the wound induction motor type.

21. An alternating current motor comprising:
(a) A motor frame;
(b) A motor shaft rotatably mounted within said frame;
(c) A pair of energizing terminals;
(d) A first stator winding mounted to said frame and connected across said terminals;
(e) A second stator winding mounted to said frame;
(f) A third stator winding mounted to said frame;
(g) An adjustable autotransformer mounted to said frame, and connected to said second and third stator windings and said terminals such as to permit variation of the percentage of the supply voltage across said terminals which is applied to said second and third stator windings;
(h) A fourth stator winding mounted to said frame;
(i) A fifth stator winding mounted to said frame, said fourth and fifth stator windings being connected in electrical series in a closed circuit;
(j) A sixth stator winding mounted to said frame;
(k) A seventh stator winding mounted to said frame, said sixth and seventh stator windings being connected in electrical series in a closed circuit;
(l) A first rotor winding mounted to said shaft;
(m) A second rotor winding mounted to said shaft;
(n) A third rotor winding mounted to said shaft, said first, second and third rotor windings being connected in electrical series in a closed circuit;
(o) A fourth rotor winding mounted to said shaft; and
(p) A fifth rotor winding mounted to said shaft, said fourth and fifth rotor windings being connected in electrical series in a closed circuit.

22. The alternating current motor recited in claim 21 wherein said first, second, third, fourth, sixth and seventh stator windings, and said first, second, third and fourth rotor windings are of the wound induction motor type.

23. The alternating current motor recited in claim 21 wherein said third, fourth and seventh stator windings are electromagnetically coupled.

24. The alternating current motor recited in claim 21 wherein:
(a) Said first stator winding is electromagnetically coupled to said first rotor winding;
(b) Said sixth stator winding is electromagnetically coupled to said third rotor winding;
(c) Said second stator winding is electromagnetically coupled to said fourth rotor winding; and
(d) Said fifth stator winding is electromagnetically coupled to said fifth rotor winding.

25. The alternating current motor recited in claim 21 wherein said first, second and third stator windings and said second rotor winding are wound in phase with each other.

26. The alternating current motor recited in claim 21 wherein:
(a) Said first stator winding is mounted to said motor frame in a first section of said frame;
(b) Said third, fourth and seventh stator windings are mounted to said motor frame in a second section of said frame;

(c) Said fifth stator winding is mounted to said motor frame in a third section of said frame;
(d) Said autotransformer is mounted to said motor frame in a fourth section of said motor frame;
(e) Said second stator winding is mounted to said motor frame in a fifth section of said frame; and
(f) Said sixth stator winding is mounted to said motor frame in a sixth section of said frame.

27. The alternating current motor recited in claim 21 wherein said first, second, third, fourth and fifth rotor windings are each mounted to said motor shaft on separate rotor structures attached to said shaft.

28. The alternating current motor recited in claim 21 wherein:
(a) Said first stator winding is mounted to said motor frame in a first section of said frame;
(b) Said third, fourth and seventh stator windings are mounted to said motor frame in a second section of said frame;
(c) Said fifth stator winding is mounted to said motor frame in a third section of said frame;
(d) Said autotransformer is mounted to said motor frame in a fourth section of said motor frame;
(e) Said second stator winding is mounted to said motor frame in a fifth section of said frame;
(f) Said sixth stator winding is mounted to said motor frame in a sixth section of said frame; and
(g) Said first, second, third, fourth and fifth rotor windings are each mounted to said motor shaft on separate rotor structures attached to said shaft.

29. The alternating current motor recited in claim 21 wherein said fifth stator winding and said fifth rotor winding comprise a transformer having said fifth rotor winding as a rotating primary and said fifth stator winding as a stationary secondary thereof.

30. The alternating current motor recited in claim 21 wherein said first, second, third, fifth and seventh stator windings and said first, second, third, fourth and fifth rotor windings have the same polarity, and wherein said fourth and sixth stator windings have a polarity opposite thereto.

31. The alternating current motor recited in claim 21 wherein voltages are transferred to rotor windings of the motor from stator windings of the motor, and to stator windings of the motor from rotor windings of the motor, solely by inductive means.

References Cited
UNITED STATES PATENTS

| | | | |
|---|---|---|---|
| 1,968,852 | 8/1934 | Ramos et al. | 318—225 X |
| 1,968,853 | 8/1934 | Ramos et al. | 318—225 X |
| 2,006,172 | 6/1935 | Klappauf | 318—225 X |
| 2,524,361 | 10/1950 | Sawyer et al. | 310—112 X |
| 2,749,459 | 6/1956 | Williford | 310—112 X |
| 2,787,747 | 4/1957 | Drummond | 318—214 X |
| 2,796,571 | 6/1957 | Dunn | 310—112 X |
| 3,017,553 | 1/1962 | Homan | 318—243 X |
| 3,144,597 | 8/1964 | Lee | 318—225 X |

ORIS L. RADER, *Primary Examiner.*

G. RUBINSON, *Assistant Examiner.*